United States Patent
Ramlall (10) Patent No.: US 10,088,320 B1
(45) Date of Patent: Oct. 2, 2018

(54) POSITIONAL ESTIMATION METHOD USING ONE-STEP MOVEMENTS AND AN INERTIAL NAVIGATION SYSTEM

(71) Applicant: The United States of America as represented by the Secretary of the Navy, Washington, DC (US)

(72) Inventor: Rohan Y. Ramlall, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/981,821

(22) Filed: May 16, 2018

(51) Int. Cl.
*H04W 24/00* (2009.01)
*G01C 21/16* (2006.01)
*G01C 25/00* (2006.01)

(52) U.S. Cl.
CPC ......... *G01C 21/165* (2013.01); *G01C 25/005* (2013.01)

(58) Field of Classification Search
CPC ....... H04W 4/02; H04W 4/029; H04W 64/00; H04W 64/003; H04W 4/021; H04W 4/025; H04W 4/027; H04W 4/023
See application file for complete search history.

(56) References Cited

U.S. PATENT DOCUMENTS

| 6,246,361 | B1* | 6/2001 | Weill | A01H 5/10 342/357.57 |
| 8,606,188 | B2* | 12/2013 | Venkatraman | G01S 5/0236 455/67.11 |
| 9,630,639 | B2* | 4/2017 | Carter | A47F 10/04 |

(Continued)

OTHER PUBLICATIONS

Scott Gleason and Demoz Gebre-Egziabher, GNSS Applications and Methods, 2009, pp. 149-175, Artech House, Boston, United States.

(Continued)

*Primary Examiner* — Khalid Shaheed
(74) *Attorney, Agent, or Firm* — SPAWAR Systems Center Pacific; Kyle Eppele; Young Fei (57) ABSTRACT

A method for estimating the position of a mobile device. Initializing an Extended Kalman Filter. Moving mobile device from a first unknown position $(x_{t1}, y_{t1})$ at a first time $t_1$ to a second unknown position $(x_{t2}, y_{t2})$ at a second time $t_2$. Measuring distance traveled d and angle traveled θ between the first unknown position and the second unknown position. Calculating a first possible position $(x_1, y_1)$ at the first time and a second possible position $(x_2, y_2)$ the second time. Using the Extended Kalman Filter, a predicted first unknown position $(\hat{x}, \hat{y})$ is calculated at the first time. A first final value is calculated according to $\sqrt{(\hat{x}-x_1)^2+(\hat{y}-y_1)^2}$. A second final value is calculated according to $\sqrt{(\hat{x}-x_2)^2+(\hat{y}-y_2)^2}$. If the first final value is less than or equal to the second final value, the first possible position $(x_1, y_1)$ is output. Otherwise, the second possible position $(x_2, y_2)$ is output.

16 Claims, 7 Drawing Sheets

(56) References Cited

U.S. PATENT DOCUMENTS

| | | | | |
|---|---|---|---|---|
| 2011/0244881 A1* | 10/2011 | Bando | ............ | G01S 5/0072 |
| | | | | 455/456.1 |
| 2015/0312719 A1* | 10/2015 | Cho | ............ | H04W 64/003 |
| | | | | 455/456.5 |
| 2015/0351067 A1* | 12/2015 | Taylor, Jr. | ......... | G01S 11/08 |
| | | | | 455/456.1 |
| 2017/0074965 A1* | 3/2017 | Lee | ............ | G01S 5/0252 |
| 2018/0128623 A1* | 5/2018 | Surnilla | ......... | H04B 17/318 |
| 2018/0199138 A1* | 7/2018 | Dusan | ............ | H04R 5/0335 |

OTHER PUBLICATIONS

The Dang Huynh et al., Exploiting User Movement for Position Detection, 2015 12th Annual IEEE Consumer Communications and Networking Conference (CCNC), 2015, pp. 513-518.

\* cited by examiner

POSITIONAL ESTIMATION METHOD USING ONE-STEP MOVEMENTS AND AN INERTIAL NAVIGATION SYSTEM

FEDERALLY SPONSORED RESEARCH AND DEVELOPMENT

The Positional Estimation Method Using One-Step Movements and an Inertial Navigation System is assigned to the United States Government and is available for licensing and commercial purposes. Licensing and technical inquiries may be directed to the Office of Research and Technical Applications, Space and Naval Warfare Systems Center Pacific (Code. 72120), San Diego, Calif., 92152 via telephone at (619) 553-2778 or email at ssc_pac_t2@navy.mil. Reference Navy Case 103546.

BACKGROUND OF THE INVENTION

1. Field of the Invention

The present invention relates generally to a mobile device location system, and in particular to a method for effectively tracking the location of a mobile device using an inertial navigation system onboard the device and receiving and measuring signals from a transmitter with a known location.

2. Description of the Related Art

A navigation system provides the user with an estimate of position and orientation. Global Navigation Satellite Systems (GNSS) such as the Global Positioning System (GPS) are designed to assist users in estimating those quantities (e.g., position and orientation). However, GNSS requires line of sight from the satellite to the user in order to be useful in providing reliable estimates. Therefore, in order to increase the robustness of navigation systems, GNSS receivers can be integrated with other navigation sensors such as inertial navigation systems (INS) or other radio frequency (RF) systems of opportunity (such as cellular telephone signals or digital television signals).

An INS provides the user with specific force measurements (which are used to estimate acceleration vectors) and rotation rates (which are used to estimate position and orientation) at higher data rates than the GNSS. However, by itself, INS suffers from errors which increase over time, and requires regular updates from GNSS or RF signals of opportunity in order to prevent errors from growing. An RF signal of opportunity provides the user with positional information using range measurements to an RF transmitter at a known location. As RF transmitters are located on the surface of the earth, their signal strengths will tend to be higher and their signals more reliable than GNSS signals (which are weaker and transmitted from space), especially if the receiver is indoors.

Typically, an Extended Kalman Filter (EKF) is used to filter data from the GNSS, RF signals of opportunity, and the INS. The EKF is defined by its state vector, time update, and measurement update. The state vector contains the parameters for which estimation is desired. The time update is how the state vector evolves with time using a dynamic model of the system, and is referred to as the a priori state estimate. The measurement update is used to optimally combine the current measurement with the a priori state prediction, thus improving the state vector. Examples of how the EKF is used to filter and integrate GNSS, RF signals of opportunity, and INS data are described by Scott Gleason et al. in GNSS Applications and Methods, Artech House, 2009, pp. 149-75, which is herein incorporated by reference in its entirety.

SUMMARY OF THE INVENTION

The present invention is a method for estimating the position of a mobile device. An Extended Kalman Filter is initialized at the mobile device. The mobile device is physically moved from a first unknown position $(x_{t1}, y_{t1})$ at a first time $t_1$ to a second unknown position $(x_{t2}, y_{t2})$ at a second time $t_2$. A distance traveled d between the first unknown position and the second unknown position is measured at the mobile device. An angle traveled θ between the first unknown position and the second unknown position is measured at the mobile device. A first possible position $(x_1, y_1)$ is calculated at the first time. A second possible position $(x_2, y_2)$ is calculated at the second time. Using the Extended Kalman Filter, a predicted first unknown position $(\hat{x}, \hat{y})$ is calculated at the first time. A first final value is calculated according to $\sqrt{(\hat{x}-x_1)^2+(\hat{y}-y_1)^2}$. A second final value is calculated according to $\sqrt{(\hat{x}-x_2)^2+(\hat{y}-y_2)^2}$. Upon determining that the first final value is less than or equal to the second final value, the first possible position $(x_1, y_1)$ is output as the updated first position (x, y). Upon determining the first final value is greater than the second final value, the second possible position $(x_2, y_2)$ is output as the updated first position (x, y).

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

The present invention uses an Extended Kalman Filter (EKF) to filter the data from an INS and a RF signal of opportunity within a two dimensional environment. The state vector of the EKF is comprised of the following 15 parameters: a position error vector (a 3×1 vector in north east down [NED] coordinates); a velocity error vector (a 3×1 vector in NED coordinates); an orientation error vector (a 3×1 vector in radians using the 3-2-1 set Euler angles); an accelerometer bias error vector (a 3×1 vector with units in meters per second squared); and a gyroscope bias error vector (a 3×1 vector with units of radians per second). The time update phase of the EKF consists of a time update for the accelerometer and gyroscope. The present invention, method 10, is used in the measurement update of the EKF.

Figure 1:
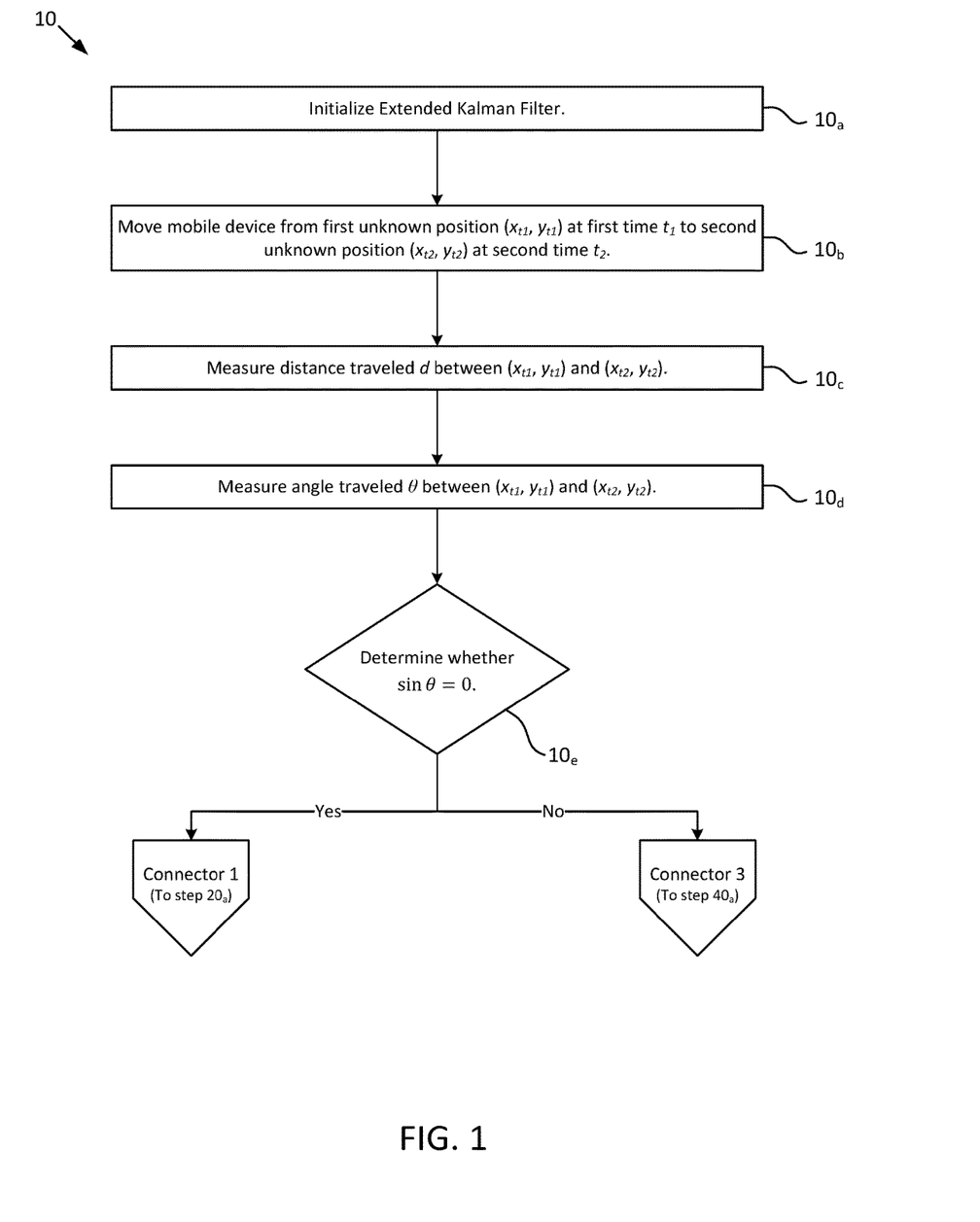
FIG. 1 is a flowchart of a method for estimating the position of a mobile device, in accordance with one embodiment of the present invention.

FIG. 1 depicts steps of a method 10 for estimating the position of a mobile device (for example, a mobile phone) with an onboard INS. Using method 10, the operator initially initializes an Extended Kalman filter at a mobile device located at a first unknown position $(x_{t1}, y_{t1})$. Step 10$_a$. The mobile device is then moved from the first unknown position $(x_{t1}, y_{t1})$ at a first time $t_1$ to a second unknown position $(x_{t2}, y_{t2})$ at a second time $t_2$. Step 10$_b$. Because the position of the transmitter (which may be an RF signal of opportunity, such as a cellular telephone tower or digital television tower) is at a known location $(x_{TX}, y_{TX})$, the first distance $R_1$ between the transmitter and the mobile device at the first unknown position $(x_{t1}, y_{t1})$ is calculated according to equation 1:

$$R_1 = \sqrt{(x_{TX}-x_{t1})^2+(y_{TX}-y_{t1})^2}. \quad (1)$$

Similarly, the second distance $R_2$ between the transmitter and the mobile device at the second unknown position $(x_{t2}, y_{t2})$ is calculated according to equation 2:

$$R_2 = \sqrt{(x_{TX}-x_{t2})^2+(y_{TX}-y_{t2})^2}. \quad (2)$$

Figure 5:
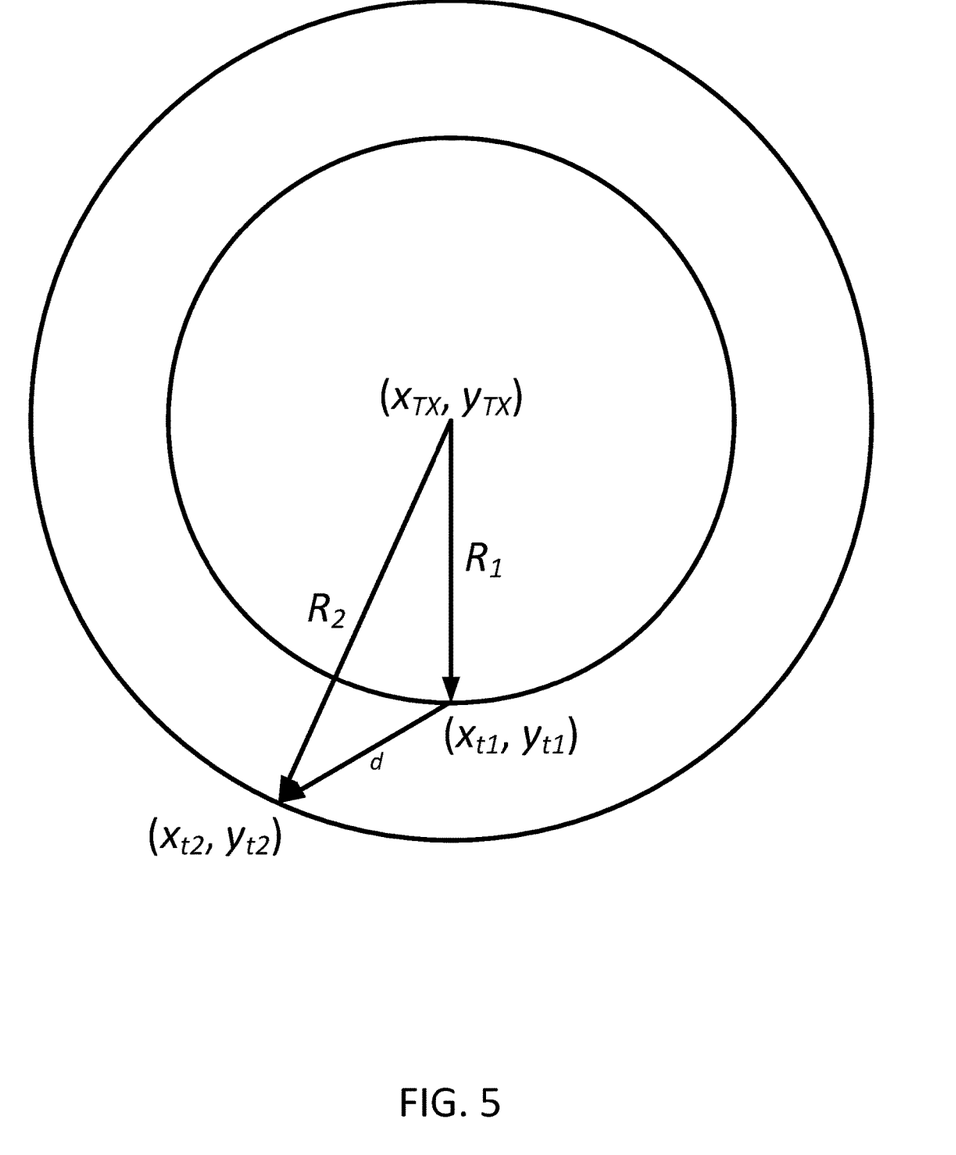
FIG. 5 is depicts the relationship between various units and measurements used in the present invention.

Using the INS onboard the mobile device, the distance traveled d between the first unknown position $(x_{t1}, y_{t1})$ and the second unknown position $(x_{t2}, y_{t2})$ is measured. Step 10$_c$. Similarly, the INS is used to measure the angle traveled between first unknown position $(x_{t1}, y_{t1})$ and the second unknown position $(x_{t2}, y_{t2})$. Step 10$_d$. The relationship between $x_{T1}, y_{t1}, x_{t2}, y_{t2}, x_{TX}, y_{TX}, R_1, R_2,$ and d is depicted in FIG. 5. The INS onboard the mobile device can then measure the angle traveled θ between the first unknown position $(x_{t1}, y_{t1})$ and the second unknown position $(x_{t2}, y_{t2})$. Step 10$_d$.

Once the angle traveled θ between the first unknown position $(x_{t1}, y_{t1})$ and the second unknown position $(x_{t2}, y_{t2})$ is known, the method determines whether equation 3 below is true, Step 10$_e$:

$$\sin \theta = 0. \quad (3)$$

Figure 2:
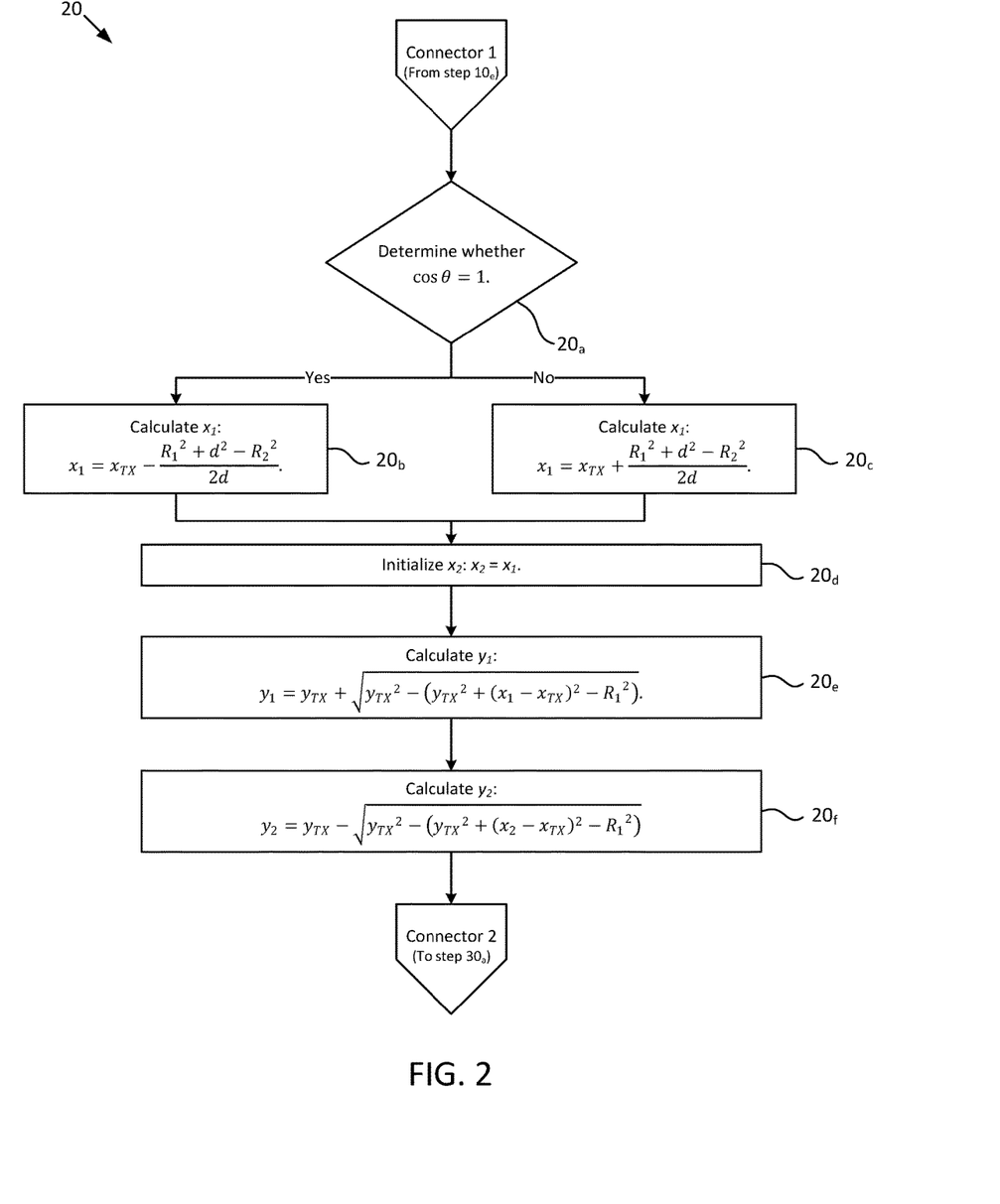
FIG. 2 is a flowchart of a method for estimating the position of a mobile device, in accordance with one embodiment of the present invention, and is a continuation of FIG. 1.

If at Step 10$_e$ sin θ is equal to zero, then the first unknown position $(x_{t1}, t_{t1})$ and the second unknown position $(x_{t2}, y_{t2})$ are calculated according to a method 20 as depicted in FIG. 2. The first step of method 20 is to determine whether equation 4 below is true, Step 20$_a$:

$$\cos \theta = 1. \quad (4)$$

If at Step 20$_a$ cos θ is equal to zero, then the next step is to calculate the x-component of the first possible position $(x_1, y_1)$ according to equation 5:

$$x_1 = x_{TX} - \frac{R_1^2 + d^2 - R_2^2}{2d}. \quad (5)$$

If at Step 20$_a$, cos θ is not equal to zero (or stated alternatively, if equation 4 is false), then the x-component of the first possible position $(x_1, y_1)$ is calculated according to equation 6, Step 20$_c$:

$$x_1 = x_{TX} + \frac{R_1^2 + d^2 - R_2^2}{2d}. \quad (6)$$

Next, proceeding after either Step 20$_b$ or Step 20$_c$, the x-component of the second possible position $(x_2, y_2)$ is initialized according to equation 7, Step 24

$$x_1 = x_{TX} + \frac{R_1^2 + d^2 - R_2^2}{2d}. \quad (7)$$

After $x_1$ and $x_2$ have been calculated, the y-components of the first possible position $(x_1, y_1)$ and of the second possible position $(x_2, y_2)$ are calculated according to equations 8 and 9 below, Step 20$_e$ and Step 20$_f$ respectively:

$$y_1 = y_{TX} + \sqrt{t_{TX}^2 - (y_{TX}^2 + (x_1 - x_{TX})^2 - R_1^2)}; \quad (8)$$

$$y_2 = y_{TX} + \sqrt{t_{TX}^2 - (y_{TX}^2 + (x_2 - x_{TX})^2 - R_1^2)}; \quad (9)$$

Figure 4:
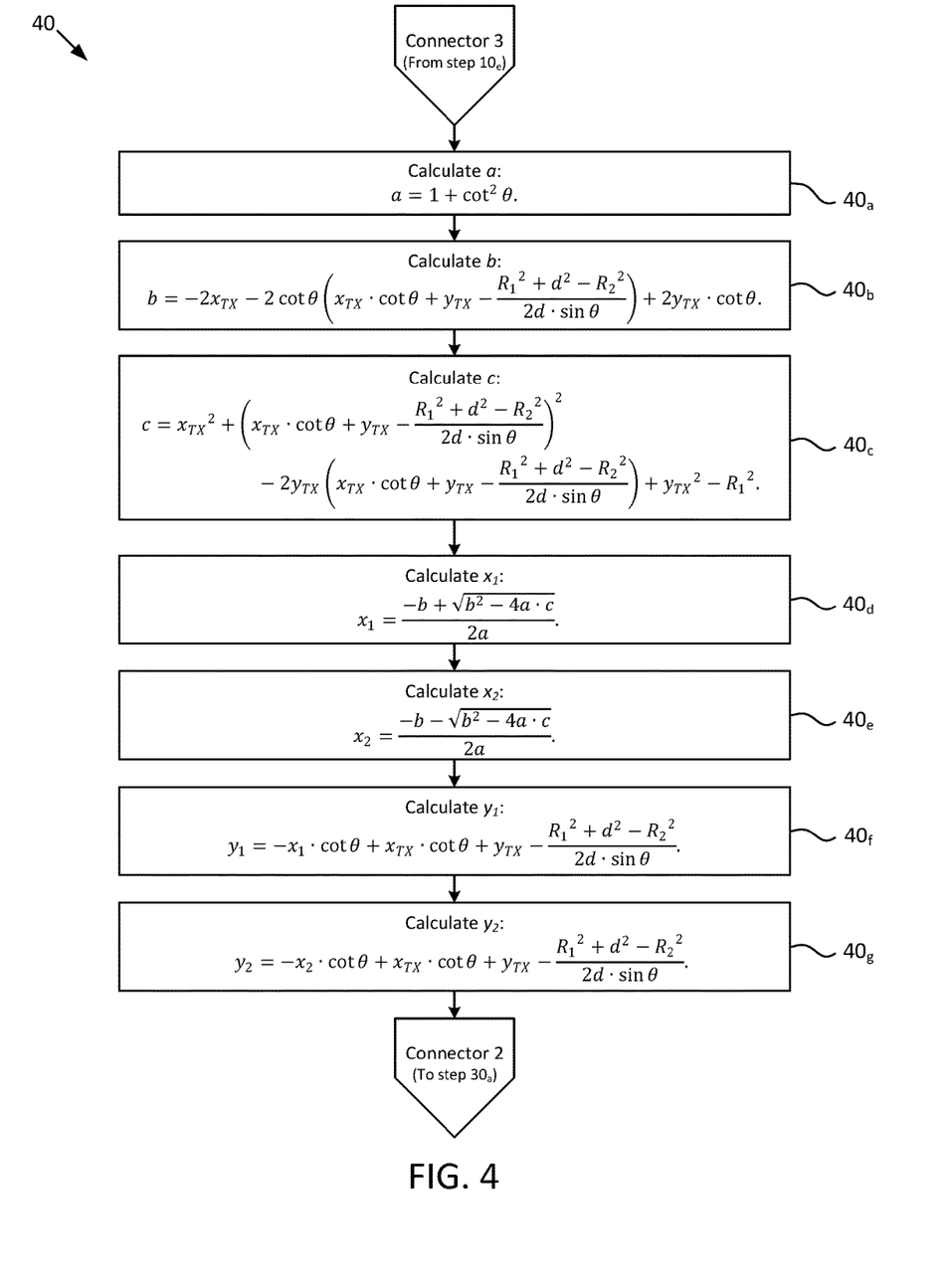
FIG. 4 is a flowchart of a method for estimating the position of a mobile device, in accordance with one embodiment of the present invention, and is a continuation of FIG. 1.

If at Step 10, sin θ is not equal to zero (or stated alternatively, if equation 3 is false), then the first possible position $(x_1, y_1)$ and the second possible position $(x_2, y_2)$ will be calculated differently according to a method 40, as depicted in FIG. 4. The first step of method 40 is to calculate the third value a according to equation 10 below, Step 40$_a$:

$$a = 1 + \cot^2 \theta. \quad (10)$$

Next, at Step 40$_b$, the fourth value b is calculated according to equation 11:

$$b = -2x_{TX} - 2\cot\theta\left(x_{TX} \cdot \cot\theta + y_{TX} - \frac{R_1^2 + d^2 - R_2^2}{2d \cdot \sin\theta}\right) + 2y_{TX} \cdot \cot\theta. \quad (11)$$

At Step 40$_e$, the fifth value c is calculated according to equation 12:

$$c = x_{TX}^2 + \left(x_{TX} \cdot \cot\theta + y_{TX} - \frac{R_1^2 + d^2 - R_2^2}{2d \cdot \sin\theta}\right)^2 - 2y_{TX}\left(x_{TX} \cdot \cot\theta + y_{TX} - \frac{R_1^2 + d^2 - R_2^2}{2d \cdot \sin\theta}\right) + y_{TX}^2 - R_1^2. \quad (12)$$

After the third, fourth, and fifth values a, b, and c have been calculated, the x-component of the first possible position $(x_1, y_1)$ may be calculated according to equation 13, Step 40$_d$:

$$x_1 = \frac{-b + \sqrt{b^2 - 4a \cdot c}}{2a}. \quad (13)$$

Next, the x-component of the second possible position $(x_2, y_2)$ may be calculated according to equation 14, Step 40$_e$:

$$x_2 = \frac{-b - \sqrt{b^2 - 4a \cdot c}}{2a}. \quad (14)$$

The y-component of the first possible position $(x_1, y_1)$ is then calculated according to equation 15, Step 40$_f$:

$$y_1 = -x_1 \cdot \cot\theta + x_{TX} \cdot \cot\theta + y_{TX} - \frac{R_1^2 + d^2 - R_2^2}{2d \cdot \sin\theta}. \quad (15)$$

Then y-component of the second possible position $(x_2, y_2)$ may be calculated according to equation 16, Step $40_g$:

$$y_2 = -x_2 \cdot \cot\theta + x_{TX} \cdot \cot\theta + y_{TX} - \frac{R_1^2 + d^2 - R_2^2}{2d \cdot \sin\theta}. \quad (16)$$

Figure 3:
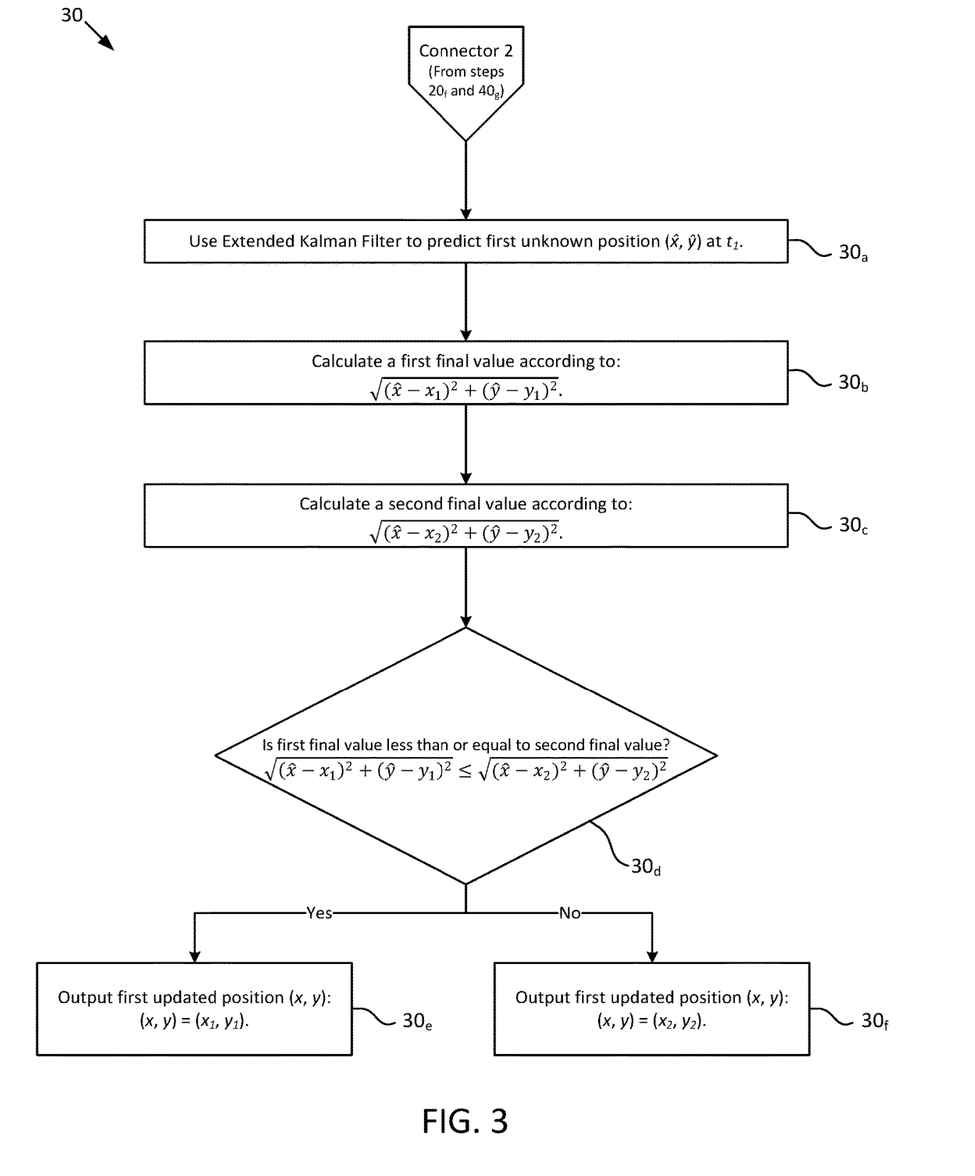
FIG. 3 is a flowchart of a method for estimating the position of a mobile device, in accordance with one embodiment of the present invention, and is a continuation of FIG. 2.

After the first possible position $(x_1, y_1)$ and the second possible position $(x_2, y_2)$ have been calculated according to either method 20 or method 40, the output of the Extended Kalman Filter can be used to determine a first updated position (x, y) by testing which of the first possible position $(x_1, y_1)$ and the second possible position $(x_2, y_2)$ are more likely to be the actual correct position of the mobile device, method 30 depicted in FIG. 3. The Extended Kalman Filter predicts a first unknown position $(\hat{x}, \hat{y})$ of the mobile device at the first time $t_1$. Step $30_a$. Next, a first final value may be calculated according to $\sqrt{(\hat{x}-x_1)^2 + (\hat{y}-y_1)^2}$, Step $30_b$, and a second final value may be calculated according to $\sqrt{(\hat{x}-x_2)^2 + (\hat{y}-y_2)^2}$, Step $30_c$. The first final value is then compared against the second final value according to the inequality set forth in equation 17 below, Step $30_d$:

$$\sqrt{(\hat{x}-x_1)^2 + (\hat{y}-y_1)^2} \leq \sqrt{(\hat{x}-x_2)^2 + (\hat{y}-y_2)^2} \quad (17)$$

If the condition of equation 17 is true (if the first final value is less than or equal to the second final value), then the first possible position $(x_1, y_1)$ is output as the first updated position (x, y). Step $30_e$. If the condition of equation 17 is false (if the first final value is greater than the second final value), then the second possible position $(x_2, y_2)$ is output as the first updated position (x, y). Step $30_f$.

Figure 6:
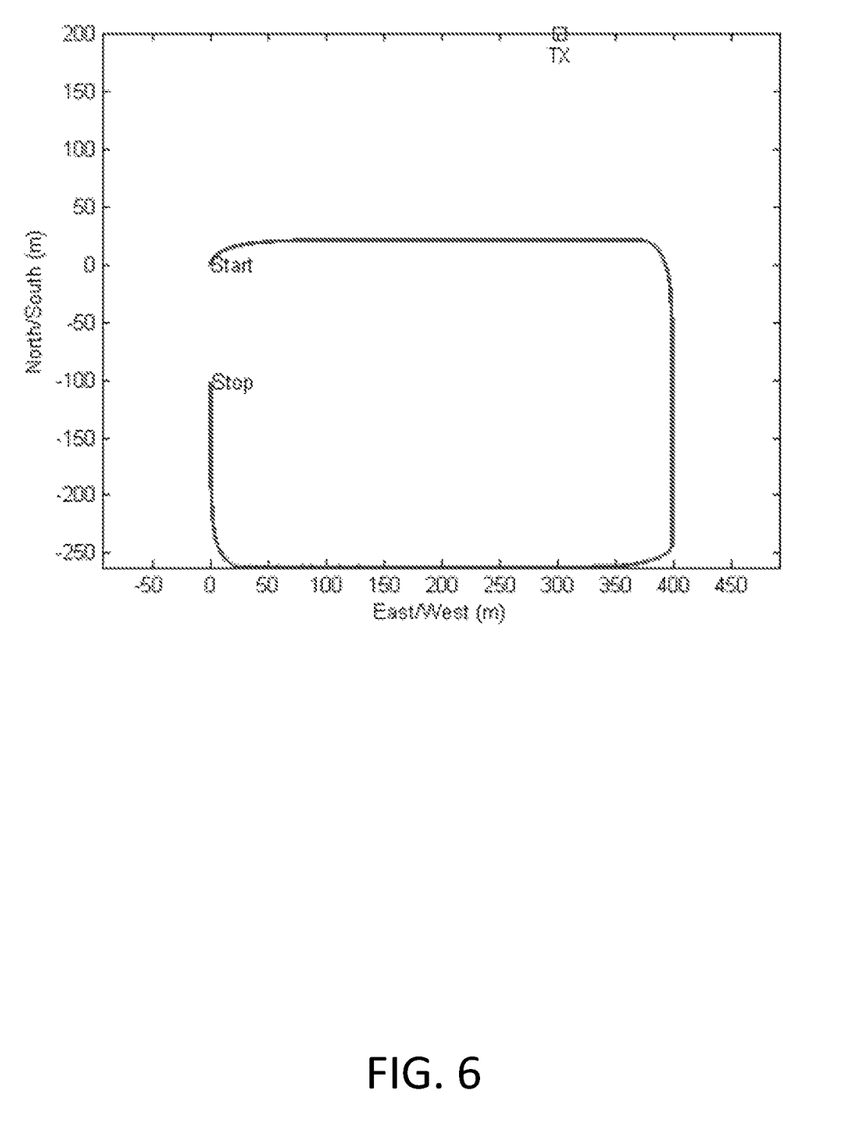
FIG. 6 depicts a plot of the simulated truth trajectory of an embodiment of the present invention.
Figure 7:
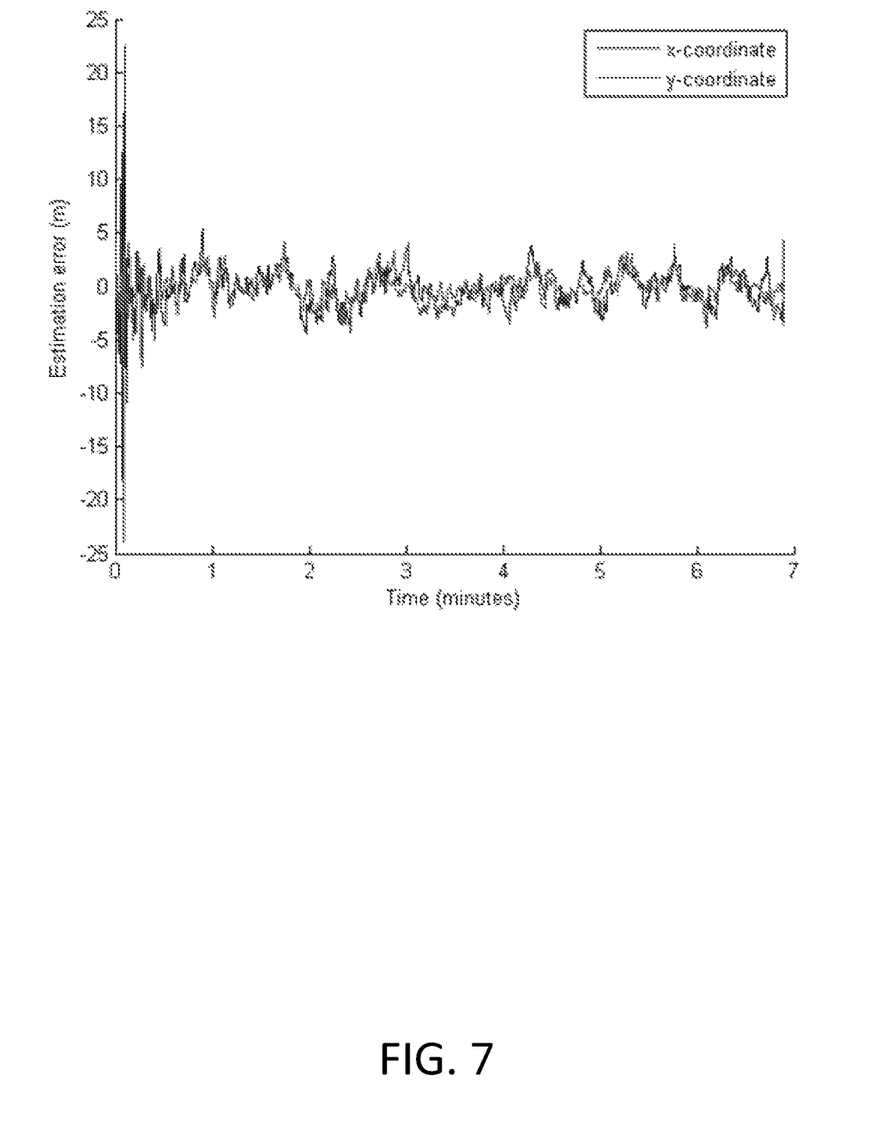
FIG. 7 depicts a plot of the simulated estimation error of an embodiment of the present invention.

The novel Positional Estimation Method Using One-Step Movements and an Inertial Navigation System has been tested in simulations using consumer grade inertial navigation systems for seven minutes using the truth trajectory depicted in FIG. 6. In FIG. 6, the transmitter is depicted as the small box labeled "TX" in the upper right quadrant, while the mobile device path is depicted as the solid line with "Start" and "Stop" at either end. In this test, the range measurements from the transmitter had a measurement accuracy of one meter. Position estimation error for the x- and y-coordinates during this simulation is depicted in FIG. 7, where the x-axis is the time of simulation in minutes, and the y-axis is the estimation error of the x- and y-coordinates in meters.

The present invention has at least several advantages over prior art position estimation methods and systems. The present invention requires the range measurement from only one transmitter at a known location (as opposed to the three typically required) and an inertial navigation system (which typically exists in most mobile devices such as mobile phones). This invention improves upon the prior art by using the predicted mobile device position from the INS data during the time update of a loosely coupled Extended Kalman Filter to determine which of the two mobile device estimates produced from the One-Step Movement calculation is correct. Then, the corrected position estimate—the first updated position (x, y)—may be used to correct inertial navigation system errors in the measurement update phase of the loosely coupled Extended Kalman Filter.

From the above description of the present invention, it is manifest that various techniques may be used for implementing its concepts without departing from the scope of the claims. The described embodiments are to be considered in all respects as illustrative and not restrictive. The method disclosed herein may be practiced in the absence of any element that is not specifically claimed and/or disclosed herein. It should also be understood that the present invention is not limited to the particular embodiments described herein, but is capable of being practiced in many embodiments without departure from the scope of the claims.

What is claimed is:

1. A method for estimating a position of a mobile device comprising the following steps:
   initializing at the mobile device an Extended Kalman Filter;
   physically moving the mobile device from a first unknown position $(x_{t1}, y_{t1})$ at a first time $t_1$ to a second unknown position $(x_{t2}, y_{t2})$ at a second time $t_2$;
   measuring at the mobile device a distance traveled d between the first unknown position and the second unknown position;
   measuring at the mobile device an angle traveled θ between the first unknown position and the second unknown position;
   calculating a first possible position $(x_1, y_1)$ at the first time;
   calculating a second possible position $(x_2, y_2)$ at the second time;
   using the Extended Kalman Filter to calculate a predicted first unknown position $(\hat{x}, \hat{y})$ at the first time;
   calculating a first final value according to $\sqrt{(\hat{x}-x_1)^2 + (\hat{y}-y_1)^2}$;
   calculating a second final value according to $\sqrt{(\hat{x}-x_2)^2 + (\hat{y}-y_2)^2}$;
   upon determining the first final value is less than or equal to the second final value, outputting the first possible position $(x_1, y_1)$ as the updated first position (x, y); and
   upon determining the first final value is greater than the second final value, outputting the second possible position $(x_2, y_2)$ as the updated first position (x, y).

2. The method of claim 1, further comprising the step of determining a first value according to sin θ.

3. The method of claim 2, further comprising the step of upon determining the first value is equal to 0, determining a second value according to cos θ.

4. The method of claim 3, further comprising the step of upon determining the second value is equal to 1, calculating a first x-value $x_1$ according to the relationship $$x_1 = x_{TX} - \frac{R_1^2 + d^2 - R_2^2}{2d},$$

wherein $x_{TX}$ is a coordinate of a transmitter located at $(x_{TX}, y_{TX})$, $R_1$ is a first distance between the transmitter and the first unknown position, $R_2$ is a second distance between the transmitter and the second unknown position.

5. The method of claim 4, further comprising the step of upon determining the second value is not equal to 1, calculating the first x-value $x_1$ according to the relationship $x_1 = x_{TX} +$ $$\frac{R_1^2 + d^2 - R_2^2}{2d}.$$

6. The method of claim 5, further comprising the step of initializing a second x-value $x_2$ according to the relationship $x_2 = x_1$.

7. The method of claim 6, further comprising the step of calculating a first y-value $y_1$ according to the relationship $y_1 = y_{TX} + \sqrt{y_{TX}^2 - (y_{TX}^2 + (x_1 - x_{TX})^2 - R_1^2)}$.

8. The method of claim 7, further comprising the step of calculating a second y-value $y_2$ according to the relationship $y_2 = y_{TX} - \sqrt{y_{TX}^2 - (y_{TX}^2 + (x_2 - x_{TX})^2 - R_1^2)}$.

9. The method of claim 8, further comprising the step of upon determining the first value is not equal to 0, calculating a third value A according to the relationship $a = 1 + \cot^2 \theta$.

10. The method of claim 9, further comprising the step of calculating a fourth value b according to the relationship $$b = -2x_{TX} - 2\cot\theta\left(x_{TX} \cdot \cot\theta + y_{TX} - \frac{R_1^2 + d^2 - R_2^2}{2d \cdot \sin\theta}\right) + 2y_{TX} \cdot \cot\theta.$$

11. The method of claim 10, further comprising the step of calculating a fifth value c according to the relationship $$c = x_{TX}^2 + \left(x_{TX} \cdot \cot\theta + y_{TX} - \frac{R_1^2 + d^2 - R_2^2}{2d \cdot \sin\theta}\right)^2 - 2y_{TX}\left(x_{TX} \cdot \cot\theta + y_{TX} - \frac{R_1^2 + d^2 - R_2^2}{2d \cdot \sin\theta}\right) + y_{TX}^2 - R_1^2.$$

12. The method of claim 11, further comprising the step of calculating the first x-value $x_1$ according to the relationship $$x_1 = \frac{-b + \sqrt{b^2 - 4a \cdot c}}{2a}.$$

13. The method of claim 12, further comprising the step of calculating the second x-value $x_2$ according to the relationship $$x_2 = \frac{-b - \sqrt{b^2 - 4a \cdot c}}{2a}.$$

14. The method of claim 13, further comprising the step of calculating the first y-value $y_1$ according to the relationship $$y_1 = -x_1 \cdot \cot\theta + x_{TX} \cdot \cot\theta + y_{TX} - \frac{R_1^2 + d^2 - R_2^2}{2d \cdot \sin\theta}.$$

15. The method of claim 14, further comprising the step of calculating the second y-value $y_2$ according to the relationship $$y_2 = -x_2 \cdot \cot\theta + x_{TX} \cdot \cot\theta + y_{TX} - \frac{R_1^2 + d^2 - R_2^2}{2d \cdot \sin\theta}.$$

16. A method for estimating a position of a mobile device comprising the following steps:
   initializing at the mobile device an Extended Kalman Filter;
   physically moving the mobile device from a first unknown position $(x_{t1}, y_{t1})$ at a first time $t_1$ to a second unknown position $(x_{t2}, y_{t2})$ at a second time $t_2$;
   measuring at the mobile device a distance traveled d between the first unknown position and the second unknown position;
   measuring at the mobile device an angle traveled $\theta$ between the first unknown position and the second unknown position;
   determining a first value according to $\sin \theta$;
   upon determining the first value is equal to 0,
      determining a second value according to $\cos \theta$;
      upon determining the second value is equal to 1,
         calculating a first x-value $x_1$ according to the relationship $$x_1 = x_{TX} - \frac{R_1^2 + d^2 - R_2^2}{2d},$$

wherein $x_{TX}$ is a coordinate of a transmitter located at $(x_{TX}, y_{TX})$, $R_1$ is a first distance between the transmitter and the first unknown position, $R_2$ is a second distance between the transmitter and the second unknown position;
   upon determining the second value is not equal to 1,
      calculating the first x-value $x_1$ according to the relationship $$x_1 = x_{TX} + \frac{R_1^2 + d^2 - R_2^2}{2d};$$

initializing a second x-value $x_2$ according to the relationship $x_2 = x_1$;
   calculating a first y-value $y_1$ according to the relationship $$y_1 = y_{TX} + \sqrt{y_{TX}^2 - (y_{TX}^2 + (x_1 - x_{TX})^2 - R_1^2)};$$

calculating a second y-value $y_2$ according to the relationship $$y_2 = y_{TX} - \sqrt{y_{TX}^2 - (y_{TX}^2 + (x_2 - x_{TX})^2 - R_1^2)};$$

upon determining the first value is not equal to 0,
      calculating a third value a according to the relationship $a = 1 + \cot^2 \theta$;
      calculating a fourth value b according to the relationship $$b = -2x_{TX} - 2\cot\theta\left(x_{TX} \cdot \cot\theta + y_{TX} - \frac{R_1^2 + d^2 - R_2^2}{2d \cdot \sin\theta}\right) + 2y_{TX} \cdot \cot\theta;$$

calculating a fifth value c according to the relationship $$c = x_{TX}^2 + \left(x_{TX} \cdot \cot\theta + y_{TX} - \frac{R_1^2 + d^2 - R_2^2}{2d \cdot \sin\theta}\right)^2 - 2y_{TX}\left(x_{TX} \cdot \cot\theta + y_{TX} - \frac{R_1^2 + d^2 - R_2^2}{2d \cdot \sin\theta}\right) + y_{TX}^2 - R_1^2;$$

calculating the first x-value $x_1$ according to the relationship $$x_1 = \frac{-b + \sqrt{b^2 - 4a \cdot c}}{2a};$$

calculating the second x-value $x_2$ according to the relationship $$x_2 = \frac{-b - \sqrt{b^2 - 4a \cdot c}}{2a};$$

calculating the first y-value $y_1$ according to the relationship $$y_1 = -x_1 \cdot \cot\theta + x_{TX} \cdot \cot\theta + y_{TX} - \frac{R_1^2 + d^2 - R_2^2}{2d \cdot \sin\theta};$$

calculating the second y-value $y_2$ according to the relationship $$y_2 = -x_2 \cdot \cot\theta + x_{TX} \cdot \cot\theta + y_{TX} - \frac{R_1^2 + d^2 - R_2^2}{2d \cdot \sin\theta};$$

using the Extended Kalman Filter to calculate a predicted first unknown position $(\hat{x}, \hat{y})$ at the first time;

calculating a first final value according to $\sqrt{(\hat{x}-x_1)^2 + (\hat{y}-y_1)^2}$;

calculating a second final value according to $\sqrt{(\hat{x}-x_2)^2 + (\hat{y}-y_2)^2}$;

upon determining the first final value is less than or equal to the second final value, outputting the first possible position $(x_1, y_1)$ as the updated first position $(x, y)$; and upon determining the first final value is greater than the second final value, outputting the second possible position $(x_2, y_2)$ as the updated first position $(x, y)$.

\* \* \* \* \*